(12) United States Patent
Vaya

(10) Patent No.: US 9,229,687 B2
(45) Date of Patent: Jan. 5, 2016

(54) PRIVATE TWO-PARTY COMPUTATION USING PARTIALLY HOMOMORPHIC ENCRYPTION

(71) Applicant: XEROX CORPORATION, Norwalk, CT (US)

(72) Inventor: Shailesh Vaya, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 184 days.

(21) Appl. No.: 14/018,707

(22) Filed: Sep. 5, 2013

(65) Prior Publication Data

US 2015/0063563 A1 Mar. 5, 2015

(51) Int. Cl.
| | |
|---|---|
| H04K 1/00 | (2006.01) |
| G06F 7/72 | (2006.01) |
| H04L 9/00 | (2006.01) |
| H04L 9/30 | (2006.01) |

(52) U.S. Cl.
CPC ................. *G06F 7/72* (2013.01); *H04L 9/008* (2013.01); *H04L 9/302* (2013.01)

(58) Field of Classification Search
CPC ............................... H04L 9/3066; G06F 7/72
USPC ........................................................... 380/30
See application file for complete search history.

(56) References Cited

U.S. PATENT DOCUMENTS

| | | | |
|---|---|---|---|
| 5,991,414 | A | 11/1999 | Garay et al. |
| 6,167,392 | A | 12/2000 | Ostrovsky et al. |
| 6,192,472 | B1 | 2/2001 | Garay et al. |
| 7,006,999 | B1 | 2/2006 | Huberman et al. |
| 7,856,100 | B2 | 12/2010 | Wang et al. |
| 7,860,244 | B2 | 12/2010 | Kerschbaum |
| 8,249,250 | B2 | 8/2012 | Rane et al. |

(Continued)

FOREIGN PATENT DOCUMENTS

WO 2012/149395 11/2012

OTHER PUBLICATIONS

Yehuda Lindell et al., "An Efficient Protocol for Secure Two-Party Computation in the Presence of Malicious Adversaries", Eurocrypt 2007, pp. 1-35.

(Continued)

*Primary Examiner* — Baotran N To
(74) *Attorney, Agent, or Firm* — Gibb & Riley, LLC

(57) ABSTRACT

A product of prime numbers and a quadratic non-residue of one of the prime numbers are received as a public key from a first party. The product of prime numbers comprises a first group and the prime numbers respectively comprise a first sub-group and a second sub-group of the first group. Data of the first party is automatically encrypted bit-wise using a computerized device by encrypting first bit values of the data of the first party as quadratic residue and encrypting second bit values of the data of the first party as quadratic non-residue to produce a first intermediate number. The first intermediate number is automatically multiplied by the quadratic non-residue of the public key using the computerized device to complete encryption of the data of the first party. A square root of a value is received from a second party. The second party does not have the quadratic residue and the quadratic non-residue. A single bit of the data of the first party is automatically decrypted for the second party by factoring the product of prime numbers to evaluate whether the single bit has a square root in the first sub-group or the second sub-group based on the square root of the value from the second party.

20 Claims, 3 Drawing Sheets

(56) References Cited

U.S. PATENT DOCUMENTS

| | | | |
|---|---|---|---|
| 8,316,237 | B1 | 11/2012 | Felsher et al. |
| 8,321,666 | B2 | 11/2012 | Kerschbaum |
| 9,083,526 | B2 * | 7/2015 | Gentry |
| 2010/0257362 | A1 | 10/2010 | Ramzan et al. |
| 2010/0329448 | A1 | 12/2010 | Rane et al. |
| 2011/0194691 | A1 | 8/2011 | Rane et al. |
| 2012/0039473 | A1 | 2/2012 | Gentry et al. |
| 2012/0213359 | A1 | 8/2012 | Troncoso Pastoriza et al. |
| 2012/0278883 | A1 | 11/2012 | Gayman |
| 2013/0339722 | A1 * | 12/2013 | Krendelev et al. ............ 713/150 |

OTHER PUBLICATIONS

Dahlia Malkhi et al., "Fairplay—A Secure Two-Party Computation System", Jul. 19, 2013, pp. 1-17.

Yan Huang et al., "Faster Secure Two-Party Computation Using Garbled Circuits", In 20th USENIX Security Symposium, San Francisco, Aug. 8-12, 2011, pp. 1-16.

Marten van Dijk et al., "Fully Homomorphic Encryption over the Integers", Jun. 8, 2010, pp. 1-28.

Anand Louis, "Secure 2-Party Computation", Theoretical Foundations of Cryptography, Georgia Tech, Spring 2010. pp. 1-5.

Andrew Yao, Protocols for Secure Computations, IEEE, 1982, pp. 1-5.

* cited by examiner

PRIVATE TWO-PARTY COMPUTATION USING PARTIALLY HOMOMORPHIC ENCRYPTION

BACKGROUND

Systems and methods herein generally relate to information retrieval from an electronic storage device and, more particularly, to methods to facilitate private retrieval of information using partially homomorphic encryption.

Two-party computation is a general problem in which two parties participate to compute the value of a bi-variate function f(.,.) on two inputs i1, i2, where input i1 is contributed by the first party and input i2 is contributed by the second party. The output may become available to both parties or to only one of them. It is easy to accomplish such computation if the first party just sends its input to the second party who then computes the function on the two inputs (or vice versa); however, the problem for secure computation is for the parties to compute the output in such a manner that both parties learn nothing more about the input of the other party than what can be derived from the output value and their individual inputs.

Secure two-party computation is thus a general problem that finds vast applications in privacy preserving data mining, information retrieval, etc. An effective, efficient, and practical Homomorphic encryption scheme would enable many cryptographic constructs, as well as have enormous applications for cloud computing. Many attempts have been made to create a fully Homomorphic encryption scheme, which is one that allows arbitrary computations on encrypted data without needing the help of the decrypter. Partially Homomorphic encryption schemes allow a few different types of operations on the encrypted data but not the computation of a universal NAND gate. For practical applications, the primary method of conducting two-party computations still uses a method on garbled circuits.

SUMMARY

Disclosed herein is a fast and efficient method for performing Homomorphic computations with the help of some interaction with the decrypter (who holds the decryption key). Vast number of applications can use computations on encrypted data, such as data mining, etc. The methods disclosed herein employ a few rounds of interaction with the decrypter to compute a circuit. The methods disclosed herein can be used to compute a Universal Gate (two input, single output) NAND, on encrypted data with the help of interaction with the decrypter. The method is based on computations on encryption system based on assumption about hardness of distinguishing Quadratic Residues from Quadratic Non-residues.

According to a method herein, a product of prime numbers and a quadratic non-residue of one of the prime numbers is received as a public key from a first party. The product of prime numbers comprises a first group and the prime numbers respectively comprise a first sub-group and a second sub-group of the first group. Data of the first party is automatically encrypted bit-wise using a computerized device by encrypting first bit values of the data of the first party as quadratic residue and encrypting second bit values of the data of the first party as quadratic non-residue to produce a first intermediate number. The first intermediate number is automatically multiplied by the quadratic non-residue of the public key using the computerized device to complete encryption of the data of the first party. A square root of a value is received from a second party. The second party does not have the quadratic residue and the quadratic non-residue. A single bit of the data of the first party is automatically decrypted for the second party by factoring the product of prime numbers to evaluate whether the single bit has a square root in the first sub-group or the second sub-group based on the square root of the value from the second party.

According to an interactive method for secure two-party computation herein, a public key is created. The public key comprises a product of prime numbers and a quadratic non-residue of one of the prime numbers. The product of prime numbers comprises a first group and the prime numbers respectively comprise a first sub-group and a second sub-group of the first group. Data of a first party is automatically encrypted, using the public key. Automatically encrypting the data comprises encrypting first bit values of the data of the first party as quadratic residue and encrypting second bit values of the data of the first party as quadratic non-residue. A first intermediate number is automatically produced. The first intermediate number is automatically multiplied by the quadratic non-residue of the public key to complete encryption of the data of the first party. A portion of the data of the first party is provided in encrypted format to a second party. A square root of a value is received from the second party. The second party does not have the quadratic residue and the quadratic non-residue. A single bit of the data of the first party is automatically decrypted for the second party by factoring the product of prime numbers in order to evaluate whether the single bit has a square root in the first sub-group or the second sub-group based on the square root of the value from the second party. The single bit of the data of the first party and the public key is provided to the second party.

According to a method of computing a circuit herein, a first party creates a public key comprising a product of prime numbers and a quadratic non-residue of one of the prime numbers. The product of prime numbers comprises a first group and the prime numbers respectively comprise a first sub-group and a second sub-group of the first group. The first party automatically encrypts data of the first party, using the public key. Automatically encrypting the data comprises encrypting first bit values of the data of the first party as quadratic residue (QR) and encrypting second bit values of the data of the first party as quadratic non-residue (QNR) to produce a first intermediate number. The first party automatically multiplies the first intermediate number by the quadratic non-residue of the public key to complete encryption of the data of the first party. The first party creates tables having at least four rows and three columns of random QRs and QNRs as inputs to the table and random QRs and QNRs in an output of the table according to an output of the circuit. The first party randomizes the tables according to a random permutation. The first party sends the tables to a second party. A portion of the tables is decrypted by factoring the product of prime numbers to evaluate whether the bit has a square root in the first sub-group or the second sub-group based on the square root of the value from the second party. The first party receives a table containing a square root of a value from the second party. The second party does not have the quadratic residue and the quadratic non-residue. The first party decrypts the table received from the second party and verifies entries in the table as QRs. The first party identifies a row in the table received from the second party corresponding to one of the tables of the first party based on an inverse of the random permutation. The first party automatically obtains an output of the circuit.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
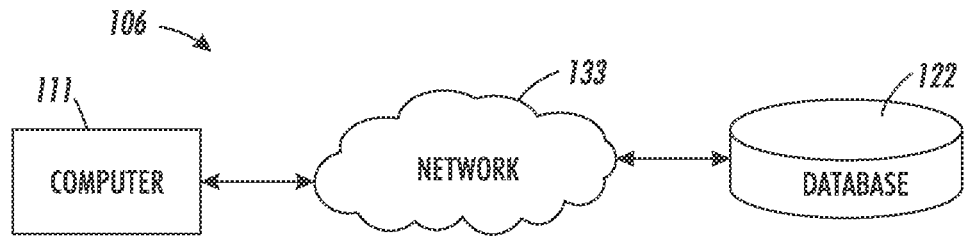
FIG. 1 is a block diagram of a system according to systems and methods herein.

For a general understanding of the features of the disclosure, reference is made to the drawings. In the drawings, like reference numerals have been used throughout to identify identical elements.

FIG. 1 is a general overview block diagram of a system, indicated generally as 106, for two-party secure communication between an inquiring computer 111 and a database 122. The inquiring computer 111 may comprise any form of processor as described in further detail below. The inquiring computer 111 can be programmed with appropriate application software to implement the methods described herein.

Database 122 includes any conventional database or any set of records or data that the inquiring computer 111 desires to retrieve. Database 122 may be any organized collection of data operating with any type of database management system.

A network 133 may connect the inquiring computer 111 and the database 122. Network 133 comprises a communication network either internal or external, for affecting communication between the inquiring computer 111 and the database 122. For example, network 133 may comprise a local area network (LAN) or a global computer network, such as the Internet.

According to systems and methods herein, a Quadratic Residuosity system is used in which a '1' is encrypted as a Quadratic non-residue (QNR) and '0' is encrypted as a quadratic residue (QR) in an appropriately chosen ring (mod n), where n is product of two sufficiently large primes.

Computation of a NOT of a bit can be encrypted using this encryption system since multiplying random encryption of quadratic non-residue with the given encryption of the bit will reverse its parity.

The computation of an AND gate on (probabilistic) encryption of two bits is done with some interaction with the decrypter holding the decryption key. The decrypter sends an encrypted table of the AND gate to the computer, who plugs in his value (while hiding them at the same time) and randomizes them before sending it back to the decrypter. The decrypter then reveals the appropriate row whose output column entry is acceptable to the computer by revealing appropriate entries to him.

Similarly, an XOR gate can be computed on bits encrypted with this system (by computing the product of the two encryptions in (mod n) ring), without interaction with the decrypter. Since a large amount of arithmetic computations, such as addition, subtraction, multiplication, etc., can be based on XOR computations—this is very useful for such applications.

This disclosure demonstrates a method for computing a NAND gate. The disclosed method can be generalized to compute any function/circuit in a number of rounds that is proportional to the depth of the circuit.

For example, consider a scenario in which the following two parties participate: (a) a database owner and (b) a computer operator. The database owner has a database 122 on which the computer operator wishes to run a data-mining algorithm and compute some statistics. (The computer operator may be associated with the computer 111.) The database owner does not want to reveal the entire database 122 to the computer operator as a plain text, due to a variety of reasons. The database owner is willing to help the computer operator compute a function/circuit/algorithm on the database 122 and reveal that value.

According to the present disclosure, a method is enabled by which the database owner can help the computer operator compute a function on its database 122 without revealing intermediate values or other database secrets. The method herein enables the computer operator to compute NOT and AND gates on encryptions of two bits. Any other circuit can then be computed using similar methodology.

PRECOMPUTATION—The database owner chooses two large prime numbers p and q and outputs the product of these primes i.e., $n=p \times q$. Given n, computations can be performed in the ring (mod n). The database owner computes a Quadratic non-residue q, i.e. an element that does not have a square root in the ring (mod n), which becomes part of its public key (q, n).

Encryption is performed bit-wise; wherein '0' is encrypted as a quadratic residue and '1' is encrypted as a quadratic non-residue. A random quadratic residue is generated by taking a random number (mod n) and computing its square (mod n). A random quadratic non-residue is generated by taking a random number in group (mod n) and computing its square (mod n). The resulting number is then multiplied with the publically known quadratic non-residue q.

Decryption is performed by the database owner, using the factorization of $n=p \times q$. The database owner evaluates whether the number has a square root in (mod p) and (mod q) subgroups. The database owner uses this information to compute whether the number is a quadratic residue (mod n) or quadratic non-residue (mod n).

Revealing Decryption of a single bit—One of the properties of the above encryption system is that it is possible for the database owner to reveal the decryption of a single bit to the computer operator without revealing his decryption key. For revealing decryption of w, the computer operator either reveals the square root of w in the (mod n) group or reveals the square root of $w \times q^{\{-1\}}$ in the (mod n) group.

Protocol for Honest-but-Curious Computer Operator and Potentially Malicious Database Owner NOT can be computed by the computer operator by simply multiplying the encryption of a bit with a random QNR and computing (mod n).

To compute AND of encryptions of two bits a and b, the database owner and the computer operator proceed as follows:

a. Two input gate computation: The database owner prepares 4 row, 3 column tables of random QRs and QNRs in the inputs and respective (random) QRs/QNRs in the output, as according to output of the gate. The entries that are the rows of the table are randomized according to some random permutation. Let this table be denoted as T, where the entry in i-row and j-column is referred to as T(i, j). The database owner prepares many such tables.

| T(1, 1) | T(1, 2) | T(1, 3) |
| T(2, 1) | T(2, 2) | T(2, 3) |
| T(3, 1) | T(3, 2) | T(3, 3) |
| T(4, 1) | T(4, 2) | T(4, 3) |

T(i,1) and T(i,2) represent input bits and T(i,3) represents the output bit. The database owner sends the tables to the computer operator.

b. Except for keeping one gate/table hidden, the computer operator asks the database owner to reveal the entries in all the other tables. This can be done by revealing the decryption of the entries, as described above.

c. The computer operator verifies the correctness of the decryptions and the gate computation of the decrypted/revealed tables.

d. The computer operator interested in computing AND(a, b), where a, b are encryptions of bits, computes the first two columns of a new table in (mod n) ring as follows:

| T(1, 1) a. $r\_1\hat{\ }2$ | T(1, 2) b. $r\_1'\hat{\ }2$ |
| T(2, 1) a. $r\_2\hat{\ }2$ | T(2, 2) b. $r\_2'\hat{\ }2$ |
| T(3, 1) a. $r\_3\hat{\ }2$ | T(3, 2) b. $r\_3'\hat{\ }2$ |
| T(4, 1) a. $r\_4\hat{\ }2$ | T(4, 2) b. $r\_4'\hat{\ }2$ | where $r\_1, r\_2, r\_3, r\_4, r\_1', r\_2', r\_3', r\_4'$ are appropriately chosen random numbers in the ring (mod n) used for randomizing the entries in the table. The computer operator chooses a random permutation \pi and permutes the rows of this new table according to this permutation and sends the table to the database owner.

e. The database owner decrypts the entire table. If the computer operator computed honestly, then in exactly one row of the table both entries are found to be '0' and all the other entries should correspond to the other combinations of '0's and '1's. The database owner reveals the identity of the row for which this is so and reveals to the computer operator the square roots in (mod n) group, of these entries. The computer operator verifies the validity of whether these entries are quadratic residues or not.

f. From the identity of the row revealed by the computer operator in the previous step, the database owner computes the exact identity of the row in the original table, by using the inverse of the permutation \pi. The database owner then obtains the output "encryption" of the AND of input bits a and b.

If the database owner is dishonest, then the computer operator discovers it with very high probability. Furthermore this probability can be made arbitrarily close to 1. This can be proved using standard probabilistic arguments using independence of events and union bound that his holds true with high probability.

The database owner learns nothing about entries a, b in an Information Theoretic sense. This can be proven by using the observation that the first two entries of a truth table of a two input gate consist of all possible combinations of '0' and '1' values and computing the XOR of these entries with any two fixed inputs bits x, y will simply permute the rows of the truth table, while still keeping all initial entries in the truth table. Since the computer operator further permutes the row of the truth table before sending it to the database owner in asking it to reveal the identity of the row which has both '1' values, the database owner learns nothing at all—in a strong information theoretic sense, about bits a, b.

Assuming the computer operator is a semi-honest party, who honestly follows the protocol except that it may try to learn more from the logs of computations, the computer operator learns nothing more from the computations except for the encryption of output of the (AND) gate for a given pair of inputs. This follows from studying the protocol and seeing that a semi-honest computer operator receives only the output computation of the AND of the two input bits.

Assume that there are multiple executions of the protocol (and other protocols) occurring concurrently, the computer operator still learns nothing more from the execution of the protocol than the outputs of the gates. This requires more rigorous and elaborate argumentation to prove; however, intuitively it follows the original argument for a single table.

Computing an Arbitrary Logic Circuit C

The above disclosure has demonstrated a method for computing any two input XOR, AND and NOT gate. The method can be extended along the same lines to compute any other two input gate.

For computing an arbitrary logic circuit C on a set of input values, some of which belong to the party of the database owner and others of which belong to the party of the computer operator, the extension of the method is obvious. The outputs of one GATE, computed using the method as described above are now obvious: use the intermediate outputs generated in the computation of some GATE as described above, as private inputs to other GATES of the circuit. The final output generated with this process is the output to be computed.

Computing an Arbitrary Logic Circuit with Potentially Malicious Computer Operator The previous protocol is for an honest-but-private party computer operator, because it does not constrain the party of the computer operator in any way to follow the honest protocol. For example, the computer operator could potentially send a different encrypted table and, depending on the database owner's response, try to find out some information that it is not supposed to and could potentially even attempt to compute on a different circuit.

To convert the protocol for an honest-but-curious computer operator to a robust protocol that forces the computer operator to compute only circuit C on the given set of inputs, a few steps of the protocol are modified and enhanced as follows:

d. In Step d, when the computer operator sends the table, it also associates commitments to the output values in the table:

| T(1, 1) a. $r\_1\hat{\ }2$ | T(1, 2) b. $r\_1'\hat{\ }2$ | Bit-Commitment (T(1, 3)) |
| T(2, 1) a. $r\_2\hat{\ }2$ | T(2, 2) b. $r\_2'\hat{\ }2$ | Bit-Commitment (T(2, 3)) |
| T(3, 1) a. $r\_3\hat{\ }2$ | T(3, 2) b. $r\_3'\hat{\ }2$ | Bit-Commitment (T(3, 3)) |
| T(4, 1) a. $r\_4\hat{\ }2$ | T(4, 2) b. $r\_4'\hat{\ }2$ | Bit-Commitment (T(4, 3)) | where $r\_1, r\_2, r\_3, r\_4, r\_1', r\_2', r\_3', r\_4'$ are appropriately chosen random numbers in the ring (mod n) used for randomizing the entries in the table.

e. The computer operator chooses a random permutation \pi and permutes the rows of this new table according to this permutation, and sends the table to the database owner.

These commitments are used at later stage in the protocol, that is, when the output row is identified as the following:

| T(3, 1) a. $r\_3\hat{\ }2$ | T(3, 2) b. $r\_3'\hat{\ }2$ | Bit-Commitment (T(3, 3)) |

The Bit Commitment is used as input in computation of some other gate of the circuit. For example, to prove to the database owner that it has honestly done the computations as expected of it, the computer operator gives a Zero-Knowledge Proof (ZKP) of the following NP statement: $\exists$ a, b, $r\_1, r\_1', r\_2, r\_2', r\_3, r\_3', r\_4, r\_4', \pi$ such that the table sent by it in Step d, using $T(.,.)$, sent to it by the database owner in the previous step, is computed according to the rules described in Step d.

The correctness of the Bit Commitment and Zero-Knowledge Proofs indicates that the computer operator has computed the correct circuit on an appropriate set of inputs. Note that additional rounds may not be required for Zero-Knowledge Proofs, as they may be deferred and given in batch, i.e., concurrently at the end of the computation.

Figure 2:
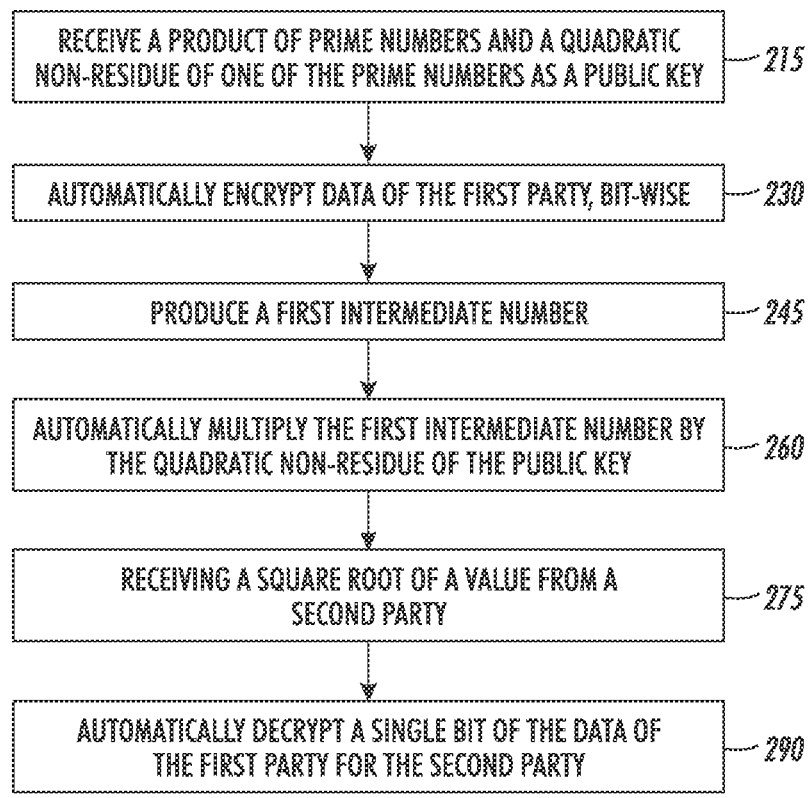
FIG. 2 is a flow diagram of various methods herein.

FIG. 2 is flowchart illustrating exemplary methods herein. In item 215, a product of prime numbers and a quadratic non-residue of one of the prime numbers are received as a public key from a first party. The product of prime numbers comprises a first group and the prime numbers respectively comprise a first sub-group and a second sub-group of the first group. In item 230, data of the first party is automatically encrypted, bit-wise, using a computerized device, by encrypting first bit values of the data of the first party as quadratic residue and encrypting second bit values of the data of the first party as quadratic non-residue to produce a first intermediate number, in item 245. In item 260, the first intermediate number is automatically multiplied by the quadratic non-residue of the public key using the computerized device to complete encryption of the data of the first party. In item 275, a square root of a value is received from a second party. The second party does not have the quadratic residue and the quadratic non-residue. In item 290, a single bit of the data of the first party is automatically decrypted for the second party by factoring the product of prime numbers to evaluate whether the single bit has a square root in the first sub-group or the second sub-group based on the square root of the value from the second party.

Figure 3:
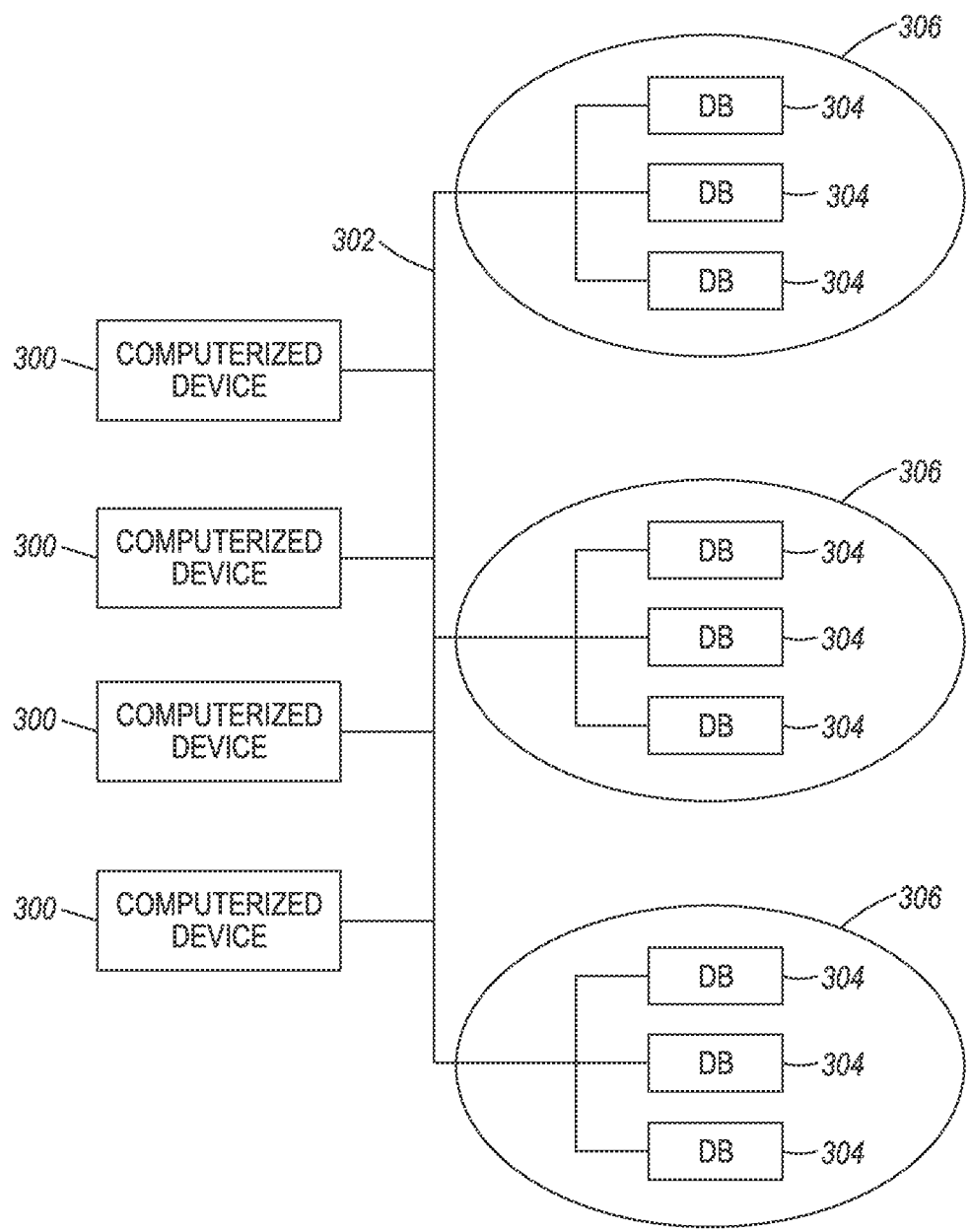
FIG. 3 is a schematic diagram illustrating systems herein.

As shown in FIG. 3, exemplary systems and methods herein may include various computerized devices 300 and databases 304 located at various different physical locations 306. The computerized devices 300 and databases 304 are in communication (operatively connected to one another) by way of a local or wide area (wired or wireless) network 302.

Figure 4:
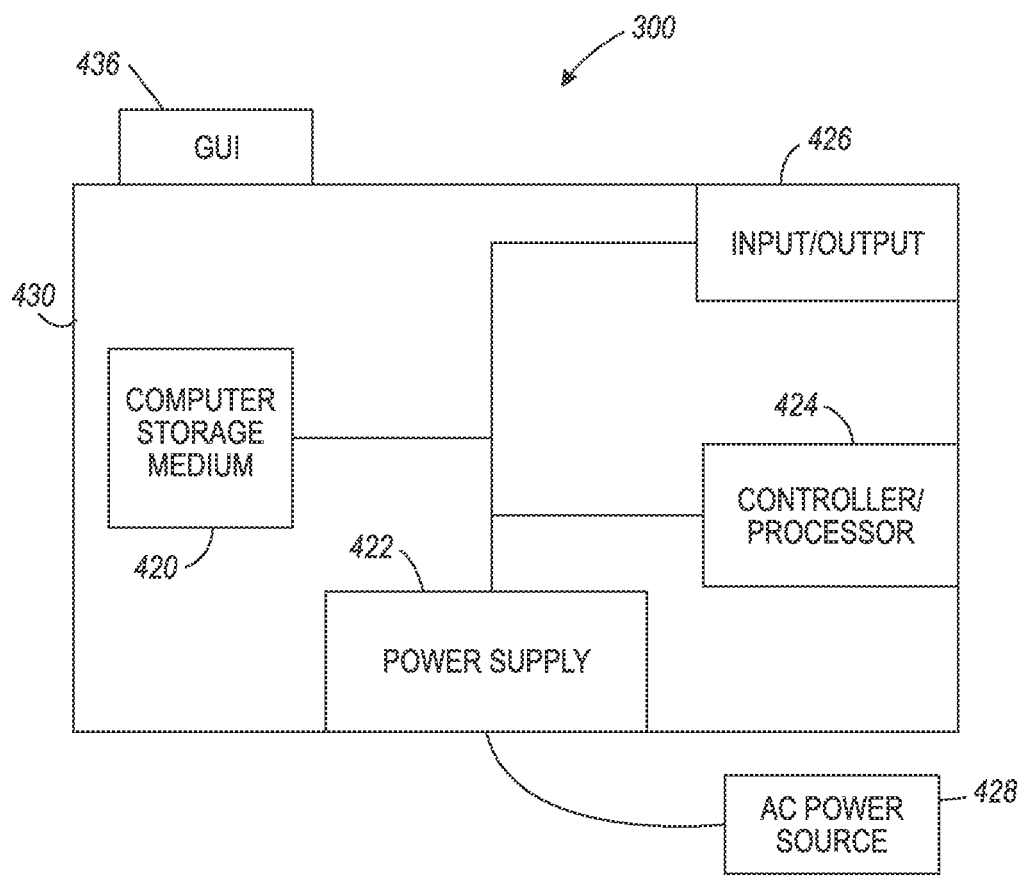
FIG. 4 is a schematic diagram illustrating devices herein.

FIG. 4 illustrates a computerized device 300, which can be used with systems and methods herein and can comprise, for example, a personal computer, a portable computing device, etc. The computerized device 300 includes a controller/processor 424 and a communications port (input/output) 426 operatively connected to the processor 424 and to the computerized network 302 external to the computerized device 300. Also, the computerized device 300 can include at least one accessory functional component, such as a graphic user interface assembly 436 that also operates on the power supplied from the external power source 428 (through the power supply 422).

The input/output device 426 is used for communications to and from the computerized device 300. The processor 424 controls the various actions of the computerized device. A non-transitory computer storage medium device 420 (which can be optical, magnetic, capacitor based, etc.) is readable by the processor 424 and stores instructions that the processor 424 executes to allow the computerized device to perform its various functions, such as those described herein. Thus, as shown in FIG. 4, a body housing 430 has one or more functional components that operate on power supplied from the alternating current (AC) 428 by the power supply 422. The power supply 422 can comprise a power storage element (e.g., a battery) and connects to an external alternating current power source 428 and converts the external power into the type of power needed by the various components.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 2. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 2.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, or material.

What is claimed is:

1. A method comprising:
   receiving a product of prime numbers and a quadratic non-residue of one of said prime numbers as a public key from a first party, said product of prime numbers comprising a first group and said prime numbers respectively comprising a first sub-group and a second sub-group of said first group;
   automatically encrypting data of said first party, bit-wise, using a computerized device, by encrypting first bit values of said data of said first party as quadratic residue and encrypting second bit values of said data of said first party as quadratic non-residue to produce a first intermediate number, said data of said first party being maintained in a first database;
   automatically multiplying said first intermediate number by said quadratic non-residue of said public key using said computerized device to complete encryption of said data of said first party;
   receiving a square root of a value from a second party, said second party not having said quadratic residue and said quadratic non-residue; and
   automatically decrypting a single bit of said data of said first party for said second party by factoring said product of prime numbers to evaluate whether said single bit has a square root in said first sub-group or said second sub-group based on said square root of said value from said second party, said decrypting enabling retrieval of said data of said first party from said first database by said second party over a computer network.

2. The method according to claim 1, said encrypting said data of said first party comprising:
   computing a square of a first random number to produce a random quadratic residue, said first random number being one of a group of numbers; and
   computing a square of a random group number from said group of numbers to produce a random quadratic non-residue.

3. The method according to claim 1, said quadratic non-residue of one of said prime numbers comprising an element that does not have a square root in said first group.

4. The method according to claim 1, said automatically encrypting said data of said first party being based on a partially homomorphic encryption function.

5. The method according to claim 1, said public key being based on quadratic residuosity using said product of said prime numbers.

6. The method according to claim 1, further comprising:
   encrypting a first bit of data, using said computerized device;
   encrypting a second bit of data, using said computerized device; and
   constructing a logic circuit having said first bit of data as a first input and said second bit of data as a second input, using said computerized device.

7. The method according to claim 6, further comprising:
   obtaining an output from said logic circuit, using said computerized device; and
   providing said output from said logic circuit as input to another logic circuit, using said computerized device.

8. The method according to claim 1, said first sub-group comprising a modulo of a first of said prime numbers and said second sub-group comprising a modulo of a second of said prime numbers.

9. An interactive method for secure two-party computation, comprising:
   creating a public key comprising a product of prime numbers and a quadratic non-residue of one of said prime numbers, said product of prime numbers comprising a first group and said prime numbers respectively comprising a first sub-group and a second sub-group of said first group, using a computerized device;
   automatically encrypting data of a first party, using said public key on said computerized device, said automatically encrypting data comprising encrypting first bit values of said data of said first party as quadratic residue and encrypting second bit values of said data of said first party as quadratic non-residue, said data of said first party being maintained in a first database;
   automatically producing a first intermediate number, using said computerized device;
   automatically multiplying said first intermediate number by said quadratic non-residue of said public key, using said computerized device, to complete encryption of said data of said first party;
   providing a portion of said data of said first party in encrypted format to a second party, using said computerized device;

receiving a square root of a value from said second party, using said computerized device, said second party not having said quadratic residue and said quadratic non-residue;

automatically decrypting a single bit of said data of said first party for said second party by factoring said product of prime numbers to evaluate whether said single bit has a square root in said first sub-group or said second sub-group based on said square root of said value from said second party, using said computerized device;

providing said single bit of said data of said first party and said public key to said second party, using said computerized device;

enabling retrieval of said data of said first party from said first database by said second party over a computer network using said single bit of said data of said first party that has been decrypted and said public key.

10. The method according to claim 9, further comprising:
computing a square of a first random number to produce a random quadratic residue, using said computerized device, said first random number being one of a group of numbers; and
computing a square of a random group number from said group of numbers to produce a random quadratic non-residue, using said computerized device.

11. The method according to claim 9, said quadratic non-residue of one of said prime numbers comprising an element that does not have a square root in said first group.

12. The method according to claim 9, said automatically encrypting said data of said first party being based on a partially homomorphic encryption function.

13. The method according to claim 9, said public key being based on quadratic residuosity using said product of said prime numbers.

14. The method according to claim 9, further comprising:
encrypting a first bit of data, using said computerized device;
encrypting a second bit of data, using said computerized device; and
constructing a logic circuit having said first bit of data as a first input and said second bit of data as a second input, using said computerized device.

15. The method according to claim 14, further comprising:
obtaining an output from said logic circuit, using said computerized device; and
providing said output from said logic circuit as input to another logic circuit, using said computerized device.

16. The method according to claim 9, said first sub-group comprising a modulo of a first of said prime numbers and said second sub-group comprising a modulo of a second of said prime numbers.

17. A method of computing a circuit comprising:
a first party creating a public key comprising a product of prime numbers and a quadratic non-residue of one of said prime numbers, said product of prime numbers comprising a first group and said prime numbers respectively comprising a first sub-group and a second sub-group of said first group;

said first party automatically encrypting data of said first party, using said public key, said automatically encrypting data comprising encrypting first bit values of said data of said first party as quadratic residue (QR) and encrypting second bit values of said data of said first party as quadratic non-residue (QNR) to produce a first intermediate number, said data of said first party being maintained in a first database;

said first party automatically multiplying said first intermediate number by said quadratic non-residue of said public key to complete encryption of said data of said first party;

said first party creating tables having at least four rows and three columns of random QRs and QNRs as inputs to said table and random QRs and QNRs in an output of said table according to an output of said circuit;

said first party randomizing said tables according to a random permutation;

said first party sending said tables to a second party over a computer network, and decrypting a portion of said tables by factoring said product of prime numbers to evaluate whether said bit has a square root in said first sub-group or said second sub-group based on said square root of said value from said second party;

said first party receiving a table containing a square root of a value from said second party over said computer network, said second party not having said quadratic residue and said quadratic non-residue;

said first party decrypting said table received from said second party and verifying entries in said table as QRs;

said first party identifying a row in said table received from said second party corresponding to one of said tables of said first party based on an inverse of said random permutation;

said first party enabling retrieval of said data of said first party from said first database by said second party over said computer network; and said first party automatically obtaining output of said circuit.

18. The method according to claim 17, said encrypting said data of said first party comprising:
computing a square of a first random number to produce a random QR, said first random number being one of a group of numbers; and
computing a square of a random group number from said group of numbers to produce a random QNR.

19. The method according to claim 17, further comprising:
computing a NOT function by multiplying encryption of a bit with a random QNR.

20. The method according to claim 17, further comprising:
obtaining an output from said circuit; and
providing said output from said circuit as input to another circuit.

* * * * *